D. E. BANGS.
BRIQUET MACHINE.
APPLICATION FILED JULY 13, 1907.

916,827.

Patented Mar. 30, 1909.
2 SHEETS—SHEET 1.

Fig. 1.

Witnesses

Inventor
David E. Bangs
By Victor J. Evans
Attorney

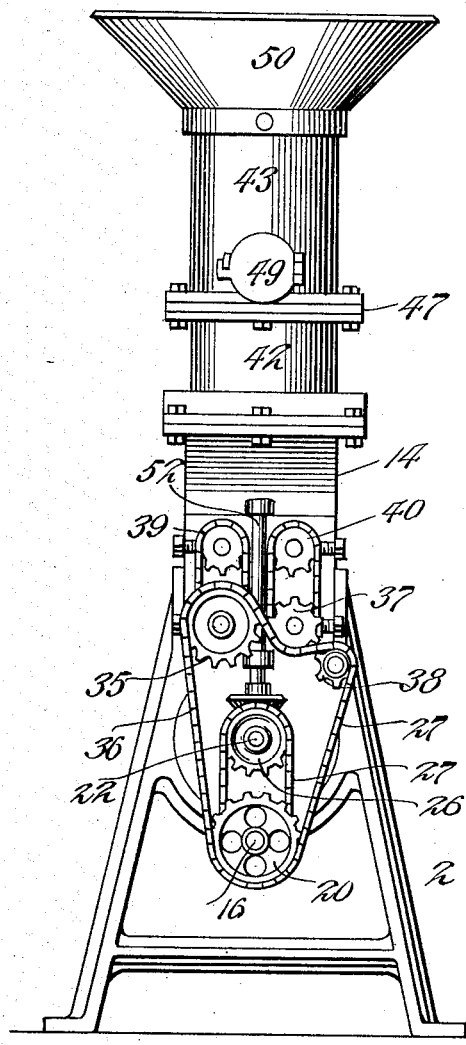
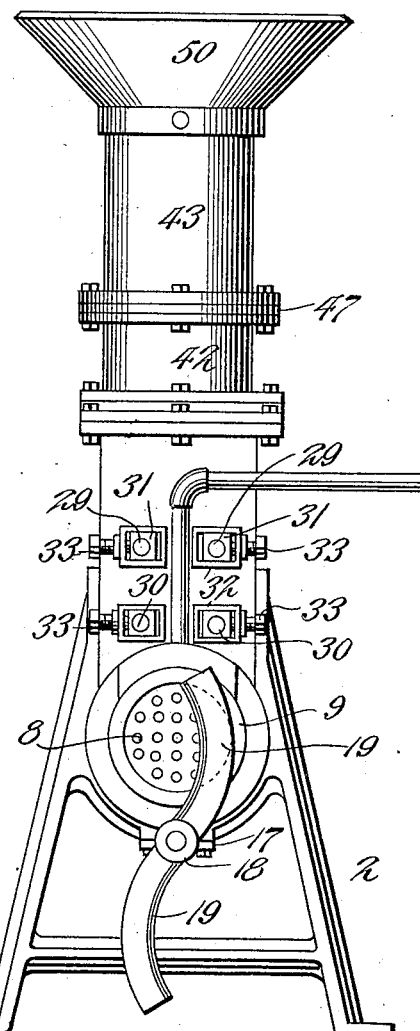

UNITED STATES PATENT OFFICE.

DAVID E. BANGS, OF MEDFORD, MASSACHUSETTS.

BRIQUET-MACHINE.

No. 916,827.	Specification of Letters Patent.	Patented March 30, 1909.

Application filed July 13, 1907. Serial No. 383,606.

*To all whom it may concern:*

Be it known that I, DAVID E. BANGS, a citizen of the United States, residing at Medford, in the county of Middlesex and State of Massachusetts, have invented new and useful Improvements in Briquet - Machines, of which the following is a specification.

This invention relates to briquet machines especially designed for preparing peat for use as fuel, and is an improvement on the machine for which Letters Patent of the United States No. 855,379 were granted to me May 28, 1907, one object of my present improvements being to provide means for separating foreign substances from the peat before the latter reaches the grinding mechanism to prevent injury to the mechanism by such foreign substances.

A further object is to provide improved means for grinding or comminuting the peat.

My invention consists in the construction, combination and arrangement of devices hereinafter described and claimed.

In the accompanying drawings,—Figure 1 is a vertical longitudinal central sectional view of a briquet machine constructed in accordance with my invention. Fig. 2 is a front elevation of the same. Fig. 3 is a rear elevation of the same.

The casing 1 is provided with supporting legs 2 and has a lower mixing or pugging chamber 3 disposed horizontally and of cylindrical form. One end of said pugging chamber is closed, as at 4, and is provided with a bearing 5. The other end of such chamber is open and receives the inner end of a tubular extension 6 which forms a feed compartment or chamber 7 which constitutes in effect the continuation of the chamber 3 and is provided at its outer end with a molding or die plate 8 which is held by an annulus 9. Said die plate has a plurality of die openings 10. The upper portion of the casing forms a grinding chamber 11 which is provided with a top plate 12 detachably bolted thereon, as at 13, and the front wall of such grinding chamber has an upwardly and outwardly inclined portion 14, the plate 12 being sufficiently long to cover such inclined portion 14 and having an opening 15 which is over the same.

A driving shaft 16 is mounted in bearings 17 and is provided at its rear end with a knife 18 which has reversely curved cutting blades 19 which operate on the rear side of the annulus 9 and serve, as hereinafter stated, to cut the material which is forced through the mold openings of the mold plate 8 in predetermined lengths. The said shaft 16 is provided near is front end with sprocket wheels 20 and 21.

Extending longitudinally through the mixing chamber 3 is a rotary shaft 22 on which is a tubular sleeve 23 provided with a plurality of rows of radiating mixing knives or blades 24 pitched at a diagonally transverse inclination, as shown, for feeding the material toward the rear end of the shaft on which there is provided, within the extension 6, a double spiral feed screw 25 which serves to force material through the openings of the mold plate. The said shaft is mounted in the bearing 5, and the feed screw at the rear end of such shaft supports the same in the tubular extension 6. Said shaft has a sprocket wheel 26 which is connected to the sprocket wheel 21 of the shaft 16 by an endless sprocket chain 27 and is further provided with a beveled gear 28.

In the grinding chamber 11 which is directly above and communicates with the pugging or mixing chamber 3 are two pairs of grinding rolls 29, 30, the former above the latter, and their shafts being journaled in bearings 31 which are adjustable and are disposed in guide openings 32 at the ends of the said grinding chamber, adjusting screws 33 being provided to adjust such pairs of grinding rolls and hold the same when set at any required adjustment. The shaft of one of the lower rolls 30 has a sprocket wheel 34 and another sprocket wheel 35, the latter being connected by an endless sprocket chain 36 to the sprocket wheel 20 of the driving shaft 16. The other lower roller shaft is provided with a sprocket wheel 37, the underside of which is engaged by the upper lead of the said sprocket chain 36, such sprocket chain passing also over a direction idle sprocket wheel 38. Since the upper lead of such sprocket chain engages the upper side of the sprocket wheel 35 of one of the lower rolls and the underside of the sprocket wheel 37 of the other lower roll, it will be apparent that such rolls are turned in reverse directions. Endless sprocket chains 39 connect the sprocket wheels 40 of the upper rolls and the sprocket wheels 34 of the lower rolls so that the upper and lower pairs of rolls are driven simultaneously.

On the upper side of the casing at the end thereof provided with the inclined wall 14 is a preliminary mixing casing which is upright, is of cylindrical form and comprises a lower section 42 and an upper section 43, said section 42 being bolted on the top plate 12 of the casing 1 and disposed over the opening 15, and said section 43 being bolted above said section 42, as at 44. A mold plate 45, which is provided with mold openings, is disposed in the opening 15, forms the bottom of the chamber formed within the lower section 42 and is secured to such lower section, as by means of bolts 46. A similar mold plate 47 is secured by the bolts 44 between the upper end of the lower section 42 and the lower end of the upper section 43. Said section 43 is provided on one side at a point near its lower end with a laterally extending tubular arm 48 which forms a trap for the reception of rock and other foreign substances which may be mixed with the peat. The outer end of such trap receptacle is provided with a hinged door 49 which may be opened or closed at will. At the upper end of the upper section 43 is a hopper 50 through which peat is fed to such upper section, and in the bottom of the said hopper is a transverse bar 51 which has a bearing for the upper end of a shaft 52, which is vertically disposed and is also journaled in openings in the mold plates 45, 47, a bearing 53 in the lower side of the inclined wall 14 and a bearing 54 at the front end of the casing 1. Said shaft has at its lower end a beveled gear 55 which engages the beveled gear 28, so that power is transmitted to such shaft 52 from the shaft 22. Mixing knives or blades 56, 57, which are similar to the knives or blades 24, project radially from the shaft 52 and operate respectively in the upper section 43 and the lower section 42. Said shaft is further provided with a cutter knife 58 disposed immediately below and coacting with the die plate 47, and a cutter knife 59 is disposed immediately below and coacts with the die plate 47, said cutter knives being similar in construction to the knife 18, hereinbefore described.

A steam pipe 60 is provided, the function of which is to discharge exhaust steam or low pressure steam into the chamber 7 formed by the tubular extension 6 of the pugging chamber 3.

The operation of my improved briquet machine is as follows: The crude peat is placed in the hopper 50 and is fed thereby into the chamber formed in the upper section 43 of the preliminary pugging casing where it is acted upon by the knives or blades 56 which serve to mix and partially disintegrate the same and force the same downwardly through the openings in the upper die plate 47, the knife 58 serving to cut the material as the same projects below said plate and cause such material to drop into the lower chamber formed in the lower section 42 of such preliminary pugging casing. The downward movement of stones or other foreign substances which may be associated with the crude peat is arrested by the die plate 47, and the action of the knives or arms 56 is such as to cause such foreign substances to be forced outwardly into the trap 48 from which they may be removed from time to time as they accumulate by first opening the door 49. The material which is discharged into the chamber formed in the lower section 42 of the preliminary pugging casing is remixed and worked by the action of the blades or arms 57, which blades also serve to force the remixed material down through the openings in the die plate 46. Such remixed material is cut by the action of the knife 59 and drops into the upper portion of the grinding chamber and upon the inclined wall 14 and is fed by such inclined wall on to the upper pair of grinding rolls 29. The action of the grinding rolls 29 and 30 is such as to cause the material to be thoroughly ground between them, and such ground material drops from the grinding chamber into the lower finally mixing or pugging chamber 3, where such material is acted upon by the mixing or pugging blades or arms 24 and forced rearwardly through such finally mixing or pugging chamber to the action of the feed screws 25 which serve to force such ground and finally pugged or mixed material through the openings of the die plate 8. As such material is thus forced by the action of the feed screw through the openings in such die plate it is moistened by the steam from the pipe 60 to cause its particles to adhere so that briquets are formed by the passage of the material through the openings in the die plate 8, such briquets being cut into lengths by the action of the cutter 18.

Having thus described the invention, what is claimed as new, is:—

1. A briquet machine comprising a casing having a lower chamber and a grinding chamber above said lower chamber, pugging, forming and cutting mechanisms in said lower chamber, longitudinally disposed grinding rolls in the grinding chamber, a plate forming a cover for such grinding chamber and having an opening above said rolls, and a preliminary mixing mechanism comprising a casing having its lower end communicating with said opening and provided at its upper end with a hopper, a perforated plate forming the bottom of said casing and a revolving stirring element in said casing above said plate and having a cutter below and coacting with said plate.

2. A briquet machine comprising a main casing having a chamber in its lower portion and a grinding chamber above said lower chamber, pugging, forming and cutting mechanisms in said lower chamber, horizontally disposed grinding rolls in said grinding chamber, said grinding chamber provided at one end with an inclined wall portion forming an overhang and provided at its upper side with a cover plate having an opening above said overhang and also above said grinding rolls, and a preliminary mixing mechanism comprising a casing having its lower end secured on said plate above said opening, said casing being further provided at its upper end with a hopper and at its lower end with a perforated plate and a shaft mounted to revolve in the last named casing, provided with stirring arms above said perforated plate and with a cutter below said perforated plate and coacting therewith.

3. In a briquet forming machine, a preliminary mixing mechanism comprising a cylindrical casing provided with a trap at one side, a revoluble shaft in said cylindrical casing having stirring means and a cutter, and a perforated plate forming the bottom of said casing immediately below said trap and immediately above said cutter.

In testimony whereof, I affix my signature in presence of two witnesses.

DAVID E. BANGS.

Witnesses:
ALBERT E. SANFORD,
CORNELIUS BUCKLEY.